US008620153B2

(12) United States Patent
Overall

(10) Patent No.: US 8,620,153 B2
(45) Date of Patent: Dec. 31, 2013

(54) SNAP-ON CAMERA FILTER MOUNT

(71) Applicant: Jeffrey Overall, Fountain Valley, CA (US)

(72) Inventor: Jeffrey Overall, Fountain Valley, CA (US)

( * ) Notice: Subject to any disclaimer, the term of this patent is extended or adjusted under 35 U.S.C. 154(b) by 0 days.

(21) Appl. No.: 13/815,287

(22) Filed: Feb. 14, 2013

(65) Prior Publication Data

US 2013/0148955 A1 Jun. 13, 2013

(51) Int. Cl.
*G03B 11/00* (2006.01)
(52) U.S. Cl.
USPC .......................................................... 396/544
(58) Field of Classification Search
USPC .......... 396/544, 448; 359/308, 359, 360, 545, 359/723, 885
See application file for complete search history.

(56) References Cited

U.S. PATENT DOCUMENTS

| 2,420,379 | A | * | 5/1947 | Mills | 396/544 |
| 4,390,242 | A | * | 6/1983 | Tatsumi | 359/892 |
| 5,040,011 | A | * | 8/1991 | Tiffen | 396/544 |
| 5,528,328 | A | * | 6/1996 | O'Farrill et al. | 396/544 |

* cited by examiner

*Primary Examiner* — Clayton E Laballe
*Assistant Examiner* — Warren K Fenwick
(74) *Attorney, Agent, or Firm* — Jeffrey A. McKinney; McKinney Law Group APC

(57) ABSTRACT

The present invention generally relates to devices for attaching light transmissive elements, such as a filter or an additional lens, to a camera lens. The present invention provides a quick release camera mount. The camera mount includes a filter mount that holds a light transmissive element fixed in place over a camera lens. It further includes: a sidewall; a first flexion plate attached to a release tab extending outwards from the sidewall, where the release tab provides for quick attachment or release from a camera lens; a second flexion plate attached to at least two locking teeth extending inwards from the sidewall.

3 Claims, 3 Drawing Sheets

SNAP-ON CAMERA FILTER MOUNT

FIELD OF THE INVENTION

The present invention generally relates to devices for attaching light transmissive elements, such as a filter or an additional lens, to a camera lens.

BACKGROUND OF THE INVENTION

There has been research and development directed to the attachment of filters and additional lenses to a camera lens. For instance, U.S. Pat. No. 5,528,328, entitled, "Camera Filter Quick Release Adapter" is allegedly directed to the following: "A camera filter quick release adapter has mobile thread grips in a lower unthreaded guide rim section of a ring fitting the female threads of a camera lens collar. The thread grips are operated to move inward and outward by release tabs above them in an upper section of the same ring. The two parts are attached by a backing and a circular bias spring holds them protruded outward through openings for each in the ring sections. The lower section does not have threads and slips inside the camera lens collar acting as a guide rim. For installing the adapter of this invention in the camera lens collar, the release tabs are manually depressed pushing the thread grips back from connecting with the camera lens collar threads until the lower section of the adapter seats in the base of the lens collar. The tabs are than released, the circular bias spring pushes the thread grips into the threads of the camera lens collar securing the adapter of this invention to the front of the camera lens. For quick releasing, the release tabs are pressed in pushing the thread grips away from the camera lens collar threads releasing the adapter. The ring of this adapter can be quickly removed and quickly installed along with a filter or other compatible photographic equipment attached to it." Abstract.

Despite research and development in this area, there is still a need in the art for new devices and methods for attaching light transmissive elements to a camera lens.

SUMMARY OF THE INVENTION

The present invention provides a quick release camera mount. The camera mount includes a filter mount that holds a light transmissive element fixed in place over a camera lens. It further includes: a sidewall; a first flexion plate attached to a release tab extending outwards from the sidewall, where the release tab provides for quick attachment or release from a camera lens; a second flexion plate attached to at least two locking teeth extending inwards from the sidewall.

DETAILED DESCRIPTION OF THE INVENTION

Figure 1:
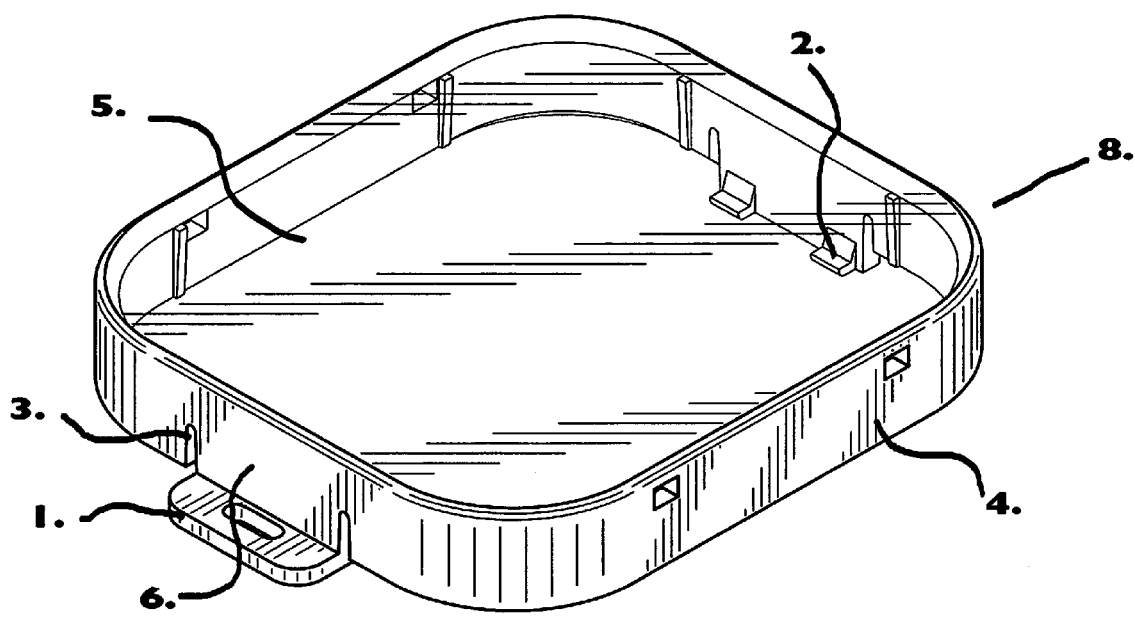
FIG. 1 shows a side elevational view of a Snap On Filter mount for a camera lens in accordance with this invention. The locking teeth can be seen through the light transmissive element in the rear of the invention. The slits, flexion plate, and release tab can be seen in the front left corner of the invention.

Referring now to the drawings where the numeral 8 indicates the invention and is hereafter referred to as invention 8. FIG. 1 shows the front elevation view of the invention 8. The release tab 1 can be seen connected to the flexion plate 6. The slits extending up the sidewall 4 create the flexion plate 6 which lies in between the two slits 3 on the sidewall 4. Opposite to the flexion plate 6 with the release tab 1 is another flexion plate 6. The locking teeth 2 can be seen extending inwards to the center of the invention 8. The light transmissive element can be seen being held in place by the sidewall 4 of the invention 8.

Figure 2:
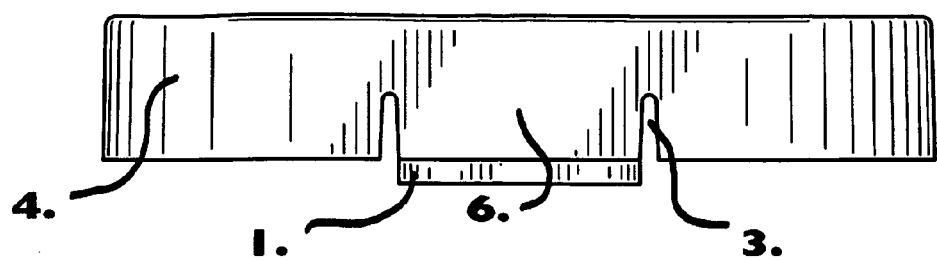
FIG. 2 shows the planal side view of the Snap on Camera filter mount. The slits can been seen extending up the sidewall, creating a flexion plate in between the two slits. The planal side view of the release tab can also be seen on the base of the flexion plate.

FIG. 2 shows the invention 8 in a side view where the slits can be seen extending up the sidewall 4. The area in between slits creates the flexion plate 6. The side view of the release tab 1 can also be seen connected to the flexion plate 6.

Figure 3:
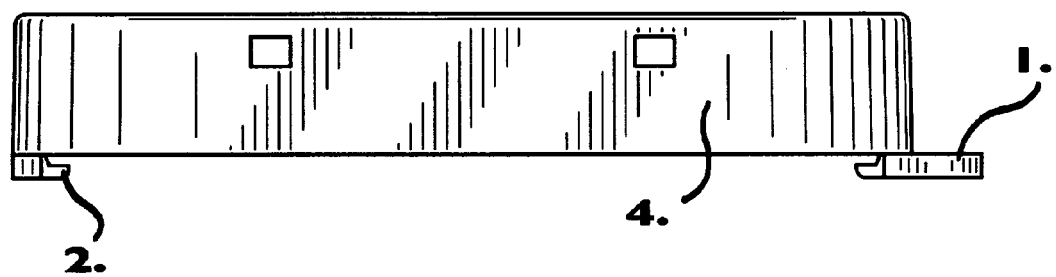
FIG. 3 shows the planal view of the sidewall of the Snap On Camera Filter Mount. The Locking teeth can be seen extending out from the flexion plate towards the center of the snap on camera filter mount. The release tab can also be seen extending out of the flexion plate on the right hand side.

FIG. 3 shows the side view of the invention 8. The locking teeth 2 can be seen extending inwards from the flexion plate 6. The release tab 1 can also be seen extending outward from the flexion plate 6.

Figure 4:
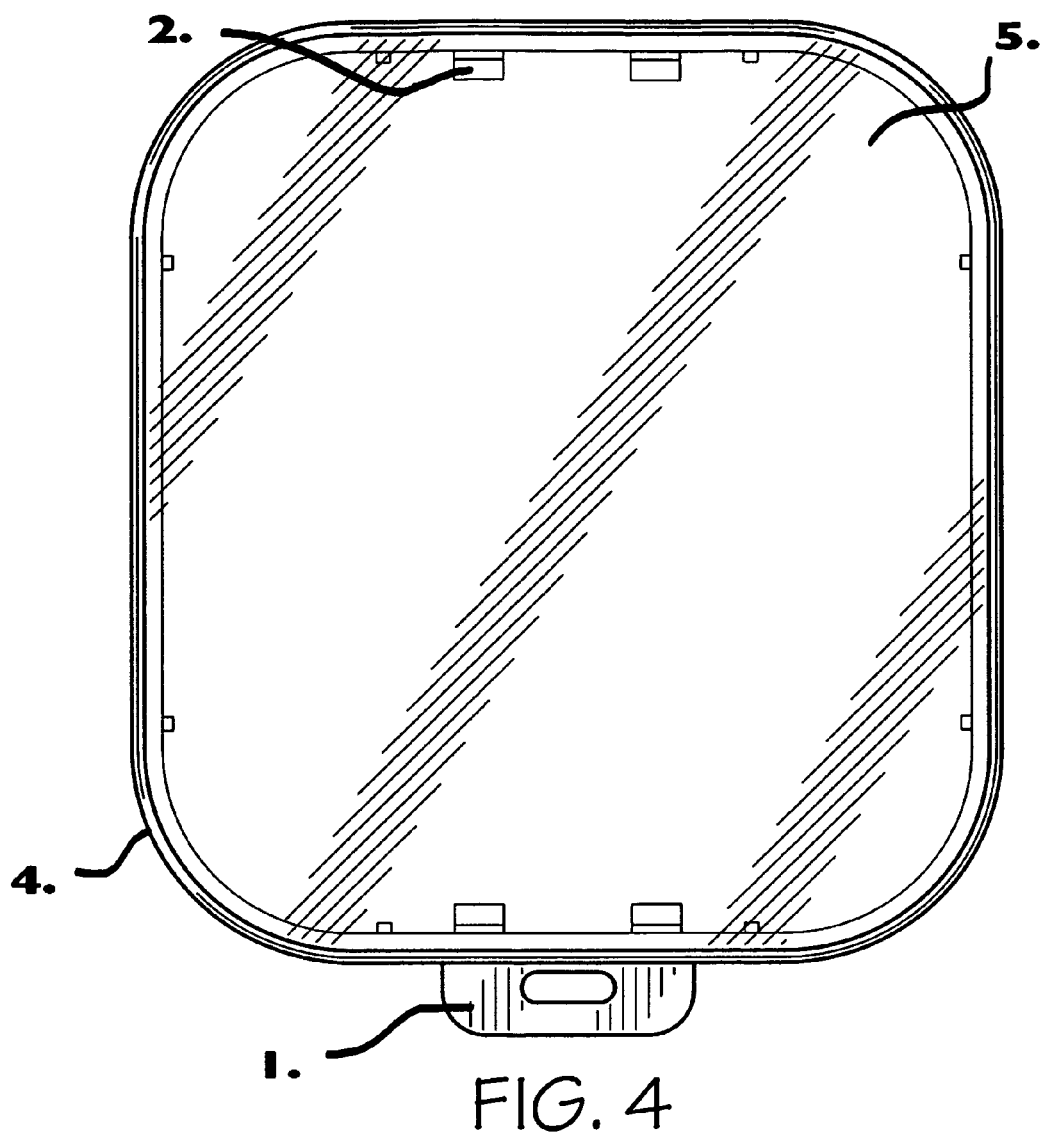
FIG. 4 shows the elevational view of the Snap on Camera filter mount. The locking teeth can be seen through the light transmissive element extending inward to the center of the invention. The release tab can be seen on the bottom of the image extending outwards.

FIG. 4 illustrates an elevation view of the invention 8. Seen looking through the light transmissive element 5 are the locking teeth 2 extending inwards to the center of the invention 8. The release tab 1 can also be seen extending outwards on the opposite side of the locking teeth 2. The sidewall 4 can also be seen through the light transmissive element 5 on the edges of the invention 8.

Operation

FIG. 1 illustrates the light transmissive element 5 mounted to the sidewall 4 of the invention 8. The structure of the sidewall 4 acts as a mounting point for the light transmissive element 5 to mount to, as well as allowing the invention 8 to slide over the outside of a camera lens. The slits 3 in the sidewall 4 of the invention 8 are designed to reduce the structural integrity of the sidewall 4, allowing the area in between the slits 3 to flex back and forth.

The area in between the two slits, called the flexion plate 6, flexes back and forth when external pressure is added. The release tab 1 is connected to the flexion plate 6. When the release tab 1 is pushed upward or downward it acts as a lever and causes the flexion plate 6 to flex back and forth. The locking teeth 2 are also connected to the flexion plate 6. When the release tab 1 is pushed upwards, the flexion plate 6 flexes outward from the invention 8, and the locking teeth 2 move outwards with the flexion plate 6.

The invention 8 is designed to go on the outside over a camera lens. A user will place the invention 8 over a camera lens, pushing the invention downward towards a camera. The force of the downward pressure causes the locking teeth 2 to come in contact with a camera lens. The pressure causes the locking teeth 2 to move the flexion plate 6 outwards from the invention 8, allowing the invention 8 to slide over a camera lens. When the locking teeth 2 no longer have pressure from a camera lens the flexion plate 6 is able to return to a state of rest as shown in FIG. 3, flush with the rest of the sidewall 4. The locking teeth now are extended into or under a camera lens keeping the invention 8 fixed in place. To release the invention 8 from a camera lens the user adds pressure to the release tab 1 in an upward direction away from a camera. The upward pressure on the release tab 1 causes the flexion plate 6 to flex outwards, allowing the locking teeth 2 to disengage from a camera lens. The invention 8 can now slide freely off of a camera lens.

From a reading of the foregoing, those familiar with the art should understand the assemblage and advantages of the present invention over available camera filter and lens attachment devices, whereas the available attachment devices are not compatible.

Alternative aspects of the invention include, for example, the modification of shapes and sizes of the sidewall, locking teeth, slits, and flexion plates to accommodate different camera lenses. The light transmissive element can be permanently affixed to the sidewall, or could also be a removable piece allowing users to switch out lenses and filters. The light transmissive element can also vary in shape size, and proportion to the sidewalls to accommodate different cameras.

DRAWING NUMBERS

1. Release Tab
2. Locking Teeth
3. Slits
4. Sidewall
5. Light Transmissive Element
6. Flexion Plate
8. Invention

The invention claimed is:

1. A quick release camera filter mount comprising:
a filter mount, wherein the mount holds a light transmissive element fixed in place over a camera lens, and wherein the mount comprises a sidewall, a first flexion plate attached to a release tab extending outwards from the sidewall, a second flexion plate attached to at least two locking teeth extending inwards from the sidewall, and wherein the release tab provides for quick attachment or release from a camera lens.

2. The quick release camera filter mount according to claim 1, wherein the light transmissive element is permanently affixed to the sidewall.

3. The quick release camera filter mount according to claim 1, wherein the light transmissive element is not permanently affixed to the sidewall, which allows a user to switch out lenses and filters in the mount.

* * * * *